M. E. STOCKWELL.
TRACTOR.
APPLICATION FILED MAR. 7, 1919.

1,347,468. Patented July 20, 1920.

INVENTOR:
Millard E. Stockwell.
by Moen & Litzenberg
Attorneys

UNITED STATES PATENT OFFICE.

MILLARD E. STOCKWELL, OF MONROVIA, CALIFORNIA.

TRACTOR.

1,347,468.   Specification of Letters Patent.   Patented July 20, 1920.

Application filed March 7, 1919. Serial No. 282,480.

*To all whom it may concern:*

Be it known that I, MILLARD E. STOCKWELL, a citizen of the United States, residing at Monrovia, in the county of Los Angeles and State of California, have invented new and useful Improvements in Tractors, of which the following is a specification.

My invention relates to tractors and has for its objects the provision of a front wheel drive tractor including a plurality of driving elements mounted in opposition to each other so as to afford a perfect balance and prevent undue strains on the running gear and frame.

A further object is to provide an economical and efficient tractor capable of heavy duty and adapted for use for farm purposes or for drawing heavy loads, means provided for connecting the vehicle with the load to be drawn in such a manner that all of the strain will be on the heaviest and most substantial parts of the frame and mechanism.

Another object is to provide in a tractor plural driving gearing mounted upon the front wheels and entirely closed for the prevention of dust and dirt from entering the gearing and thus reducing the efficiency of the mechanism.

Still another object is to provide a selective spaced mechanism by means of which a variety of different speeds forward and reverse may be obtained in the operation of the tractor and manually controlled and operated from a position near the operator's seat. Other objects will appear as the description progresses.

Referring now to the drawings of my invention, forming a part of this application, Figure 1 is a plan of my assembled mechanism.

Figure 1:
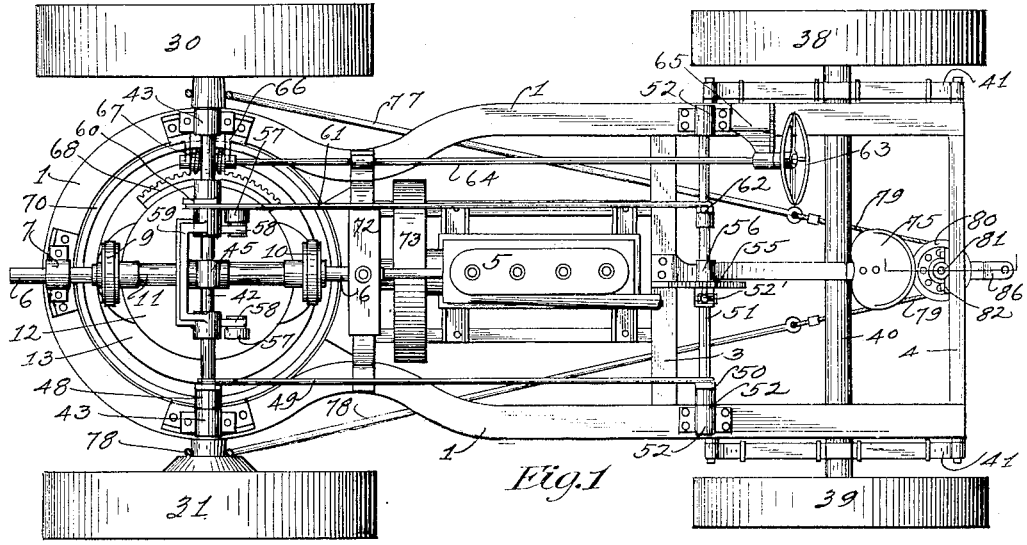
Figure 2:
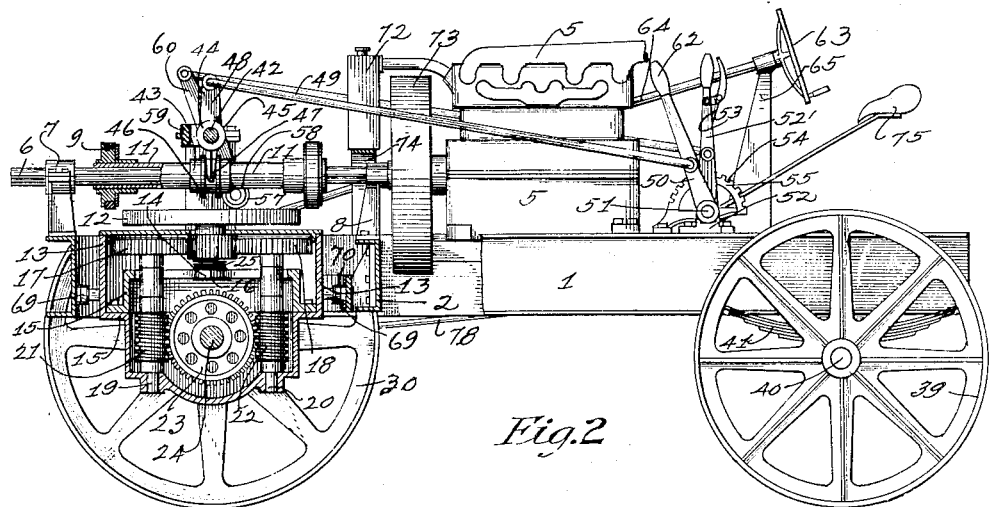
Fig. 2 is an elevation thereof, partly in section.
Figures 3, 4, 5:
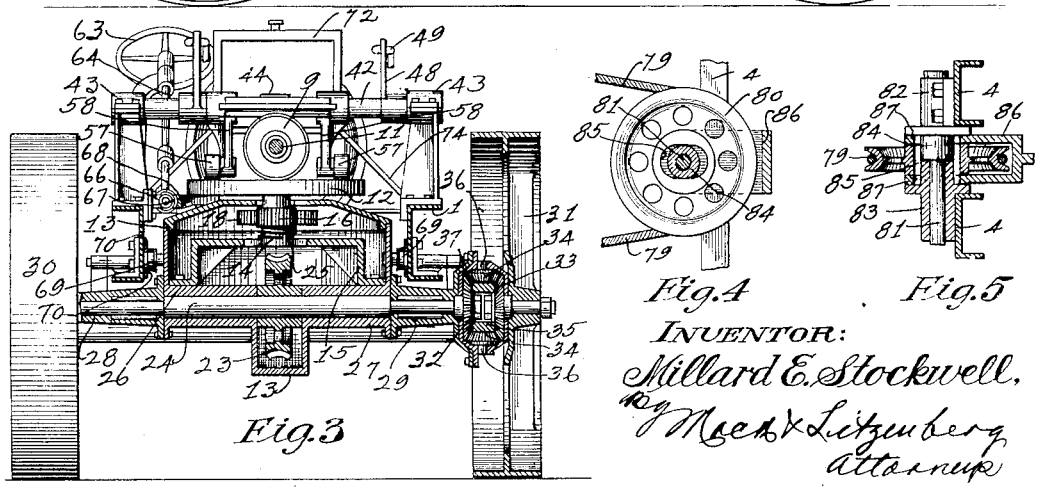
Fig. 3 is a front end elevation, in section.
Fig. 4 is an enlarged plan of the draft device.
Fig. 5 is a longitudinal section of the same.

One practical embodiment of my invention is shown in the drawings, in which a suitable frame 1, formed in the manner illustrated, has transverse members 2, 3, and 4, 4 connected therewith, providing a rigid frame upon which is adapted to be mounted the running gear and power plant. An engine or motor 5 is mounted upon a pair of parallel longitudinal members spanning the distance between and attached to the cross members 2 and 3.

I have shown a driving mechanism which includes a longitudinal driving shaft 6 connected with the engine crank shaft, not shown, and extended substantially forward of the motor 5. This shaft is supported in bearings 7 and 8 mounted upon the upper portion of the frame 1 and member 2 thereof and is provided with a pair of permanently spaced driving pinions 9 and 10 keyed or otherwise suitably attached to a sleeve 11 which is slidably disposed and splined on shaft 6 between the bearings 7 and 8, the pinions shown are friction pinions, but it is obvious that bevel gears may be used in lieu thereof.

The pinions 9 and 10 are adapted to be alternately engaged with and to drive a friction disk 12 which is mounted on a vertical shaft within a housing 13 and having a bearing 14 formed on a base 15 attached to and preferably contained in the housing 13. Also on said vertical shaft, or attached to the lower side of said disk 1, I provide a pinion gear 16 which is adapted to mesh with and communicate motion to a pair of spaced spur gears 17 and 18 arranged on opposite sides of the said pinion and carried on shafts 19 and 20, respectively, which have bearings in the housing 13 and the base member 15. Worms 21 and 22 are carried on shafts 19 and 20 and are adapted to mesh with and drive a centrally disposed worm gear 23 which is carried on the front axle 24. All of the said driving gearing, with the exception of the friction elements are mounted within and entirely inclosed by the housing 13, thus preventing the admission of dirt and the like to the gearing and also serving to form an oil receptacle, whereby all of the gears may be run in an oil bath, if found to be desirable.

A spring 25 is mounted between the base member 15 and gear 16, and serves to hold the friction disk 12 at its uppermost level for engagement with the driving pinion 9 and 10. The lower portion of housing 13 has bearings 26 and 27 formed on opposite sides of the center for the front vehicle axle 24 and at the ends thereof short housing extensions 28 and 29 are bolted to the main housing 13 and are adapted to inclose the axle ends. One end of said front axle has a traction wheel 30 thereon and the other end of said axle has a differential mechanism attached thereto between the end of the axle and the opposite traction wheel 31, said differential mechanism comprising large bevel, or ring gears 32 and 33, attached respectively, to the end of axle 24 and the wheel 31, and the pinions 34 being carried on the usual spider 35. The trunnions 36 of said spider are journaled in a central housing 37 which is adjacent to the axle housing 29, thus providing a differential between the two front, or driven wheels of the tractor.

Rear wheels 38 and 39 are carried on a rear axle 40 and springs 41 may be interposed between the frame 1 and said axle, as shown.

On the front of the vehicle above the driving shaft 6, I provide a transverse shaft 42, which is journaled in bearings 43, 43, at the ends thereof on frame 1. On the center of shaft 42, a yoke 44 is mounted which has arms 45 engaging an annular groove 46 in a shift collar 47 attached to the sleeve 11, so that the said sleeve may be shifted longitudinally of the driving shaft 6 for the purpose of imparting a forward or reverse motion of the disk 12 through the medium of the friction pinions 9 and 10. Yoke 44 is attached to shaft 42 and at one side of the vehicle, said shaft also has an arm 48 thereon which is connected by means of a rod 49 with a lever 50 at the rear end of the machine, said lever 50 being mounted on and attached to a transverse shaft 51 journaled in bearings 52 at the ends and mounted on the frame 1.

Near the center of the frame 1 on the shaft 51, I provide an operating lever 52' which has a ratchet lever or rod 53 thereon, adapted to engage a series of notches 54 on a quadrant 55, formed on a central bearing 56, so that the operation of lever 52' will move the sleeve 11, by means of the connections described, in one or the other direction on driving shaft 6, and thus bring one or the other of the pinions 9 and 10 into engagement with the disk 12. In the position shown in the drawings, said pinions are in neutral position, and it will be apparent that when moved in one direction, a forward motion will be imparted to disk 12, the speed of said disk being determined by the position of lever 52' relative to quadrant 55, and when moved in an opposite direction a reverse motion will be imparted thereto.

In order to properly engage and disengage the disk 12 with the pinions 9 and 10, I provide a suitable clutch mechanism including a pair of rollers 57, 57, carried on arms 58, 58, of a yoke 59 which is loosely held on the transverse shaft 42, which shaft also carries the gear shifting mechanism. An arm 60 on said yoke is connected by means of a rod 61 with an operating lever 62 carried on shaft 51 at the rear of the machine. Thus the movement of lever 62 rearwardly will effect a corresponding movement of the yoke 59 and rollers 57 thereon, and the engagement of said rollers with disk 12 will move said disk downwardly so as to clear the pinions 9 and 10 and permit the movement of said pinions into a selected position, in the manner described, over the disk. When disk 12 is thus depressed, the spring 25 in housing 13 is contracted so that when operating lever 62 is restored to normal position, the action of the spring will tend to restore the disk to operating position and hold the same thus until a further operation of the clutch mechanism.

The steering mechanism comprises the usual hand wheel 63 mounted on an inclined shaft 64 which is journaled in a bracket 65 at the rear end, and a smaller bracket 66 at the front end. A worm 67 is carried on the front end of the steering shaft between the bearings of the bracket 66 and is adapted to mesh with a sector 68 preferably attached to the upper and outer portion of the housing 13, as shown.

The frame 1 of the vehicle is supported on the housing 13 by means of a plurality of rollers 69 which are held between angle iron rails 70 attached to the curved front end of said frame, and said rails may also be supported in the manner shown on the transverse frame member 2 by suitable means. Frame 1 is curved inwardly at the sides opposite the rear portions of the front wheels so that a short turning radius may be provided for the tractor, the housing 13 being thus mounted concentrically on the end of frame 1, serving as a fifth wheel, such as is frequently employed in horse drawn vehicles. A radiator 72 is mounted forwardly of the fly wheel 73 on a suitable bracket or supporting frame 74 and a seat 75 is provided on the rear of the vehicle in a suitable position convenient to the steering and operating mechanism, as shown.

The draft mechanism by means of which the tractor may be used for hauling heavy loads is preferably composed of a pair of rods 77 and 78 attached at their front ends around the axle housings 28 and 29 and at their rear ends to a cable, or chain, as at 79 which is run over a sheave 80. A king pin 81 carried in brackets 82 and 83 on the rear transverse members 4, 4, extends through the hubs 84 of said brackets and the sheave 80 has an elongated aperture 85 therethrough which fits over the said hubs and permits of sufficient play for a slight movement of the sheave and the cable when the vehicle is being turned, or at other times when such play would result to advantage.

A draft yoke 86 is also carried at the ends 87 thereof on the bracket hubs 84 with clearances or play substantially the same as the sheave 80 and a cable may be attached to said yoke for the purpose of drawing a load with the tractor. It will be observed that when the front wheels are turned for making a turn of the vehicle, the cable 79 will move and the sheave 80 will be slightly rotated in one direction or the other. This form of draft device provides a hitch or draft direct from the points near the ends of the front axle so that no excessive strains will be imposed on the running gear frame.

The housing 13 being rigidly mounted on the front axle 24 and the bearings thereof being substantially long and spaced apart at the outer ends provides a maximum leverage for the steering gear, especially when the steering worm and sector are mounted and connected as shown.

A flexible mechanism is provided in this form of tractor which is relatively inexpensive and the driving mechanism is perfectly balanced by means of the worm gears for driving the front axle.

It will be understood that I do not limit my invention to the exact form of the several elements herein described, nor to their relation to each other, for it is conceived to be possible to modify the form thereof within the scope of the appended claims without departing from the spirit of my invention.

For instance, as stated, bevel gearing may be substituted for the friction gearing shown and described and in such case the housing 13 should be extended so as to cover said bevel gears. In the form of mechanism shown the power is supplied to the front wheels from the engine shaft and said shaft may also be extended rearwardly and the rear wheels driven therefrom in the same manner as shown in connection with the front wheels, thus providing a four wheel drive tractor where a maximum traction is desired.

What I claim is:

1. In a tractor, a frame, a housing rotatable thereon, a driving mechanism including a driving pinion, a pair of spaced gears journaled in said housing and having vertical axes and operated by said pinion, a pair of worm gears axially alined with said gears and operated thereby, a common gear carried on the axle of the vehicle and meshing with both of said worm gears, whereby the operation thereof may be balanced, a tractor frame, and a housing for rotatably supporting said axle and adapted to inclose said gears.

2. In a tractor, a frame, a rotatable housing thereon, means for rotating said housing, a pair of spaced traction wheels, a differential mechanism, axles for said wheels journaled in said housing, one of said axles being longer than the other, and having a worm gear thereon substantially centrally of said wheels, a pair of vertical shafts longitudinally alined with said worm gear journaled in said housing, a worm on each of said shafts meshing with said worm gear, gears on the upper ends of said shafts, a pinion journaled in said housing operably connecting said gears, and driving mechanism for applying power to said pinion.

3. In a tractor, a pair of spaced traction wheels, a differential mechanism, axles for said wheels, one of said axles being longer than the other, and having a worm gear thereon substantially centrally of said wheels, a frame, a housing rotatably mounted on said frame, a pair of vertical shafts longitudinally alined with said worm gear, a worm on each of said shafts meshing with said worm gear, gears on the upper ends of said shafts, a pinion operably connecting said gears, driving mechanism for applying power to said pinion, and means for controlling the operation of said driving mechanism.

MILLARD E. STOCKWELL.

In presence of—
 LUTHER L. MACK,
 DWIGHT BROOKS.